US00RE39310E

(19) United States
(12) Reissued Patent
Motose

(10) Patent Number: US RE39,310 E
(45) Date of Reissued Patent: Oct. 3, 2006

(54) ENGINE CONTROL SYSTEM AND METHOD

(75) Inventor: Hitoshi Motose, Hamamatsu (JP)

(73) Assignee: Yamaha Marine Kabushiki Kaisha, Shizuoka (JP)

(21) Appl. No.: 10/422,915

(22) Filed: Apr. 24, 2003

Related U.S. Patent Documents

Reissue of:
(64) Patent No.: 5,937,825
Issued: Aug. 17, 1999
Appl. No.: 08/948,105
Filed: Oct. 9, 1997

(51) Int. Cl.
*F02P 5/00* (2006.01)

(52) U.S. Cl. ..... 123/406.13; 123/690
(58) Field of Classification Search ..... 123/339.15, 123/406.13, 479, 690; 73/118.1; 701/107, 701/114; 440/1
See application file for complete search history.

(56) References Cited

U.S. PATENT DOCUMENTS 4,370,962 A * 2/1983 Hosaka ..... 123/406.13
4,966,115 A 10/1990 Ito et al.
5,146,899 A * 9/1992 Tanaka et al. ..... 123/494
5,260,877 A * 11/1993 Drobny et al. ..... 701/114
5,365,904 A * 11/1994 Nofsinger et al. ..... 123/359
5,372,112 A * 12/1994 Ohtaka et al. ..... 123/406.13
5,461,569 A * 10/1995 Hara et al. ..... 701/101
5,489,372 A * 2/1996 Hirano ..... 205/109
5,505,179 A * 4/1996 Brennan ..... 123/479
5,551,396 A * 9/1996 Suzuki et al. ..... 123/399

* cited by examiner

*Primary Examiner*—John T. Kwon
(74) *Attorney, Agent, or Firm*—Knobbe, Martens, Olson & Bear, LLP

(57) ABSTRACT

An engine control system and method that utilizes throttle position as one of its control parameters. The throttle position sensor is checked by sensing changed values in a time period when the engine is operating within a predetermined speed range during which changes in throttle position are not normally encountered.

18 Claims, 4 Drawing Sheets

ENGINE CONTROL SYSTEM AND METHOD

Matter enclosed in heavy brackets [ ] appears in the original patent but forms no part of this reissue specification; matter printed in italics indicates the additions made by reissue.

BACKGROUND OF THE INVENTION

This invention relates to an engine control system and method and more particularly to an improved sensor and sensor condition determining arrangement for such a system.

A wide variety of types of control systems have been proposed for improving the efficiency and performance of internal combustion engines. Basically, these systems sense a variety of engine running and ambient conditions and control such things as the fuel air ratio and ignition timing. These systems take a wide variety of types and form and frequently employ combustion condition sensors which sense the actual fuel air ratio and through a feedback control system adjust the fuel air ratio to maintain the desired value. Of course, other types of sensors and other types of systems are employed.

One of the actual parameters of the engine that is frequently measured for these control systems is the position of the throttle control for the engine. By determining the throttle control position such factors as engine load, operator demand or intake air flow can be determined. Generally, the throttle control sensor is a potentiometer that is associated with a component of the throttle control for determining its position.

In many types of systems, the throttle control is a butterfly-type valve that is positioned in a throttle body for the engine. The potentiometer that measures the throttle valve position is frequently mounted on the actual throttle body. This, however, gives rise to a location and mounting that can cause the sensor to deteriorate in operation. In any event, since this is an important control parameter for most types of engine controls, accuracy in the sensed information is essential.

Therefore, a principal object of this invention to provide an improved sensor and mounting arrangement and method for determining accuracy of the throttle position.

It is a further object of this invention to provide an improved method for checking the throttle position sensor and providing information in the event the sensor is operating abnormally.

SUMMARY OF THE INVENTION

This invention is adapted to be embodied in an engine control system for controlling an internal combustion engine having at least one combustion chamber, a fuel air supply system for providing fuel and air to the combustion chamber for combustion therein and an ignition system for igniting the charge in the combustion chamber. The engine control includes an operator controlled throttle member and a throttle position sensor associated therewith for providing a control system with a signal indicative of the position.

In accordance with an apparatus for practicing the invention, the system includes means for detecting when the engine is operating at a predetermined speed and for comparing the signal from the throttle position sensor with a predetermined value to check whether the sensor is providing an accurate signal.

In accordance with a method for practicing the invention, the speed of operation of the engine is detected. If the speed is within a certain range, then the output of the throttle position sensor is compared with a predetermined value to determine if the sensor output is reliable.

DETAILED DESCRIPTION OF THE PREFERRED EMBODIMENTS OF THE INVENTION

Figure 1:
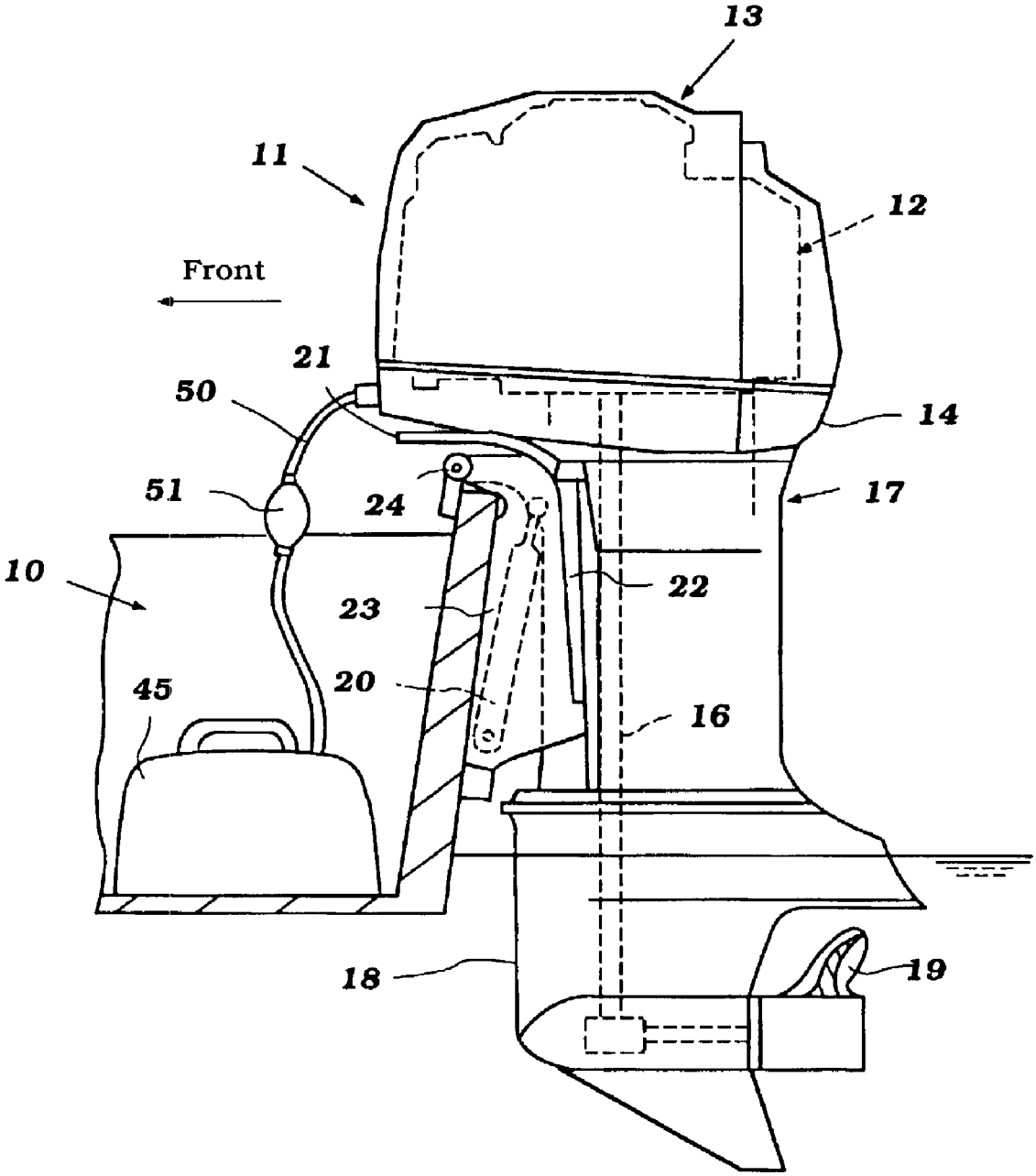
FIG. 1 is a side elevational view of an outboard motor constructed and operated in accordance with an embodiment of the invention and shown attached to the transom of a watercraft which watercraft is shown partially and in cross section.
Figure 2:
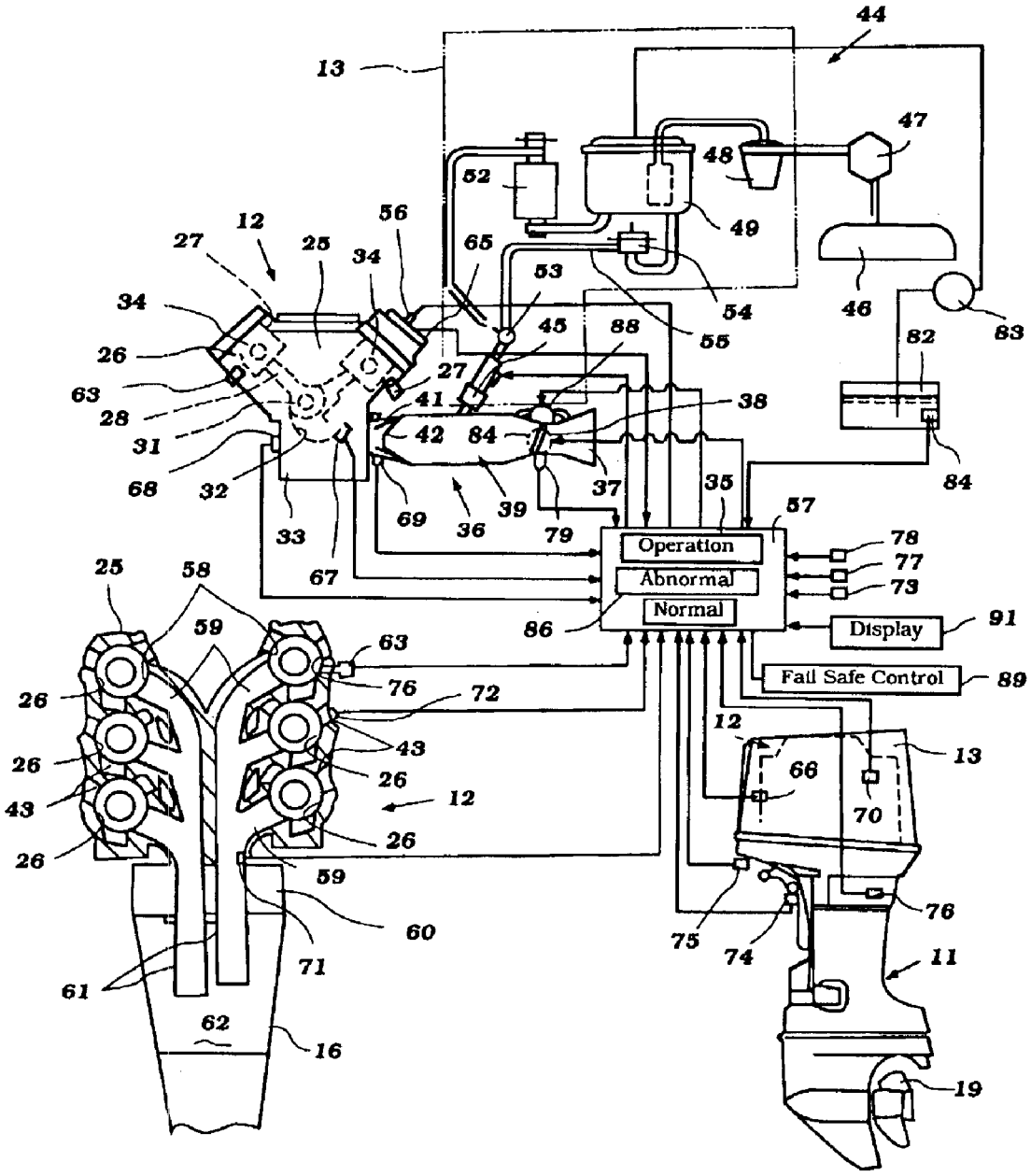
FIG. 2 is a three-part view showing in the lower right-hand corner, the outboard motor looking in the same direction as looking in FIG. 1 but on a smaller scale, on the lower left-hand side an enlarged cross-sectional view taken through the power head and upper portion of the outboard motor and in the upper portion a schematic view of the engine and the fuel and air supply system therefor. The ECU for controlling the system is shown in is associated with the various components centrally in this figure.

Referring now in detail to the drawings and initially to FIG. 1 and the lower right hand view of FIG. 2, a watercraft 10 powered by an outboard motor constructed in accordance with an embodiment of the invention and identified generally by the reference numeral 11 is illustrated. The invention is described in conjunction with an outboard motor because the invention deals with an internal combustion engine and the control system therefor. Therefore, an outboard motor is a typical application in which an engine constructed and operated in accordance with the invention may be utilized.

The outboard motor 11 is comprised of a power head that consists of a powering internal combustion engine, indicated generally by the reference numeral 12 and a surrounding protective cowling comprised of a main cowling portion 13 that is detachably connected to a tray portion 14.

As is typical with outboard motor practice, the engine 12 is supported within the power head so that its output shaft, a crankshaft indicated by the reference numeral 15 in the upper view of FIG. 2, rotates about a vertically-extending axis. This output shaft or crankshaft 15 is rotatably coupled to a drive shaft 16 that depends into and is journaled within a drive shaft housing 17. The tray 14 encircles the upper portion of the drive shaft housing 17.

The drive shaft 16 continues on into a lower unit 18 where it can selectively be coupled to a propeller 19 for driving the propeller 19 in selected forward or reverse direction so as to so propel an associated load, namely the watercraft 10. A conventional forward, reverse bevel gear transmission is provided for this purpose.

A steering shaft (not shown), having a tiller 21 affixed to its upper end, is affixed in a suitable manner to the drive shaft housing 17. This steering shaft is journaled within a swivel bracket 22 for steering of the outboard motor 11 about a vertically-extending axis defined by the steering shaft.

The swivel bracket 22 is, in turn, connected to a clamping bracket 23 by means of a trim pin 24. This pivotal connection permits tilt and trim motion of the outboard motor 11 relative to the associated transom of the powered watercraft 10. The trim adjustment permits adjustment of the angle of the attack of the propeller 19 to obtain optimum propulsion efficiency. In addition, beyond the trim range, the outboard motor 11 may be tilted up to and out of the water position for trailering and other purposes, as is well known in this art. A hydraulic cylinder 20 is interposed between the clamping bracket 23 and swivel bracket 22 for effecting this movement and for hydraulic damping, as is well known in this art.

The construction of the outboard motor 11 as thus far described may be considered to be conventional and for that reason, further details of this construction are not illustrated nor are they believed necessary to permit those skilled in the art to practice the invention.

Continuing by referring to FIG. 2 but now referring primarily the lower left hand portion of this figure and the upper portion, the engine 12 is, in the illustrated embodiment, of the V 6 cylinder type. To this end, the engine 12 is provided with a cylinder block 25 having a pair of angularly related cylinder banks in which three horizontally extending, vertically aligned, parallel cylinder bores 26 are formed. Although the invention is described in conjunction with a V 6 cylinder engine, it will be readily apparent to those skilled in the art how the invention may be utilized with engines having various cylinder numbers and cylinder configurations. In addition, the invention may also be employed with four stroke engines.

Pistons shown schematically at 27 in FIG. 2 are connected to connecting rods 28 by means of piston pins. The lower or big ends of the connecting rods 28 are journaled on respective throws 31 of the output shaft or crankshaft 15, as is well known in this art.

The crankshaft 15 is rotatably journaled within a crankcase chamber 32 formed at the lower ends of the cylinder bores 26. The crankcase chambers 32 are formed by the skirt of the cylinder block 25 and a crankcase member 33 that is affixed to the cylinder block 25 in any well known manner.

As has been noted, the engine 12 operates on a two-cycle crankcase compression principal. As is typical with such engines, the crankcase chambers 32 associated with each of the cylinder bores 26 are sealed relative to each other in any suitable manner.

The ends of the cylinder bores 26 opposite the crankcase chambers 32 are closed by means of a respective cylinder head assembly 34 that is affixed to the banks of the cylinder block 25 in any known manner. The cylinder head assembly 34 has recesses which cooperate with the cylinder bores 26 and the heads of the pistons 27 to form combustion chambers. These combustion chambers have a volume which varies cyclically during the reciprocation of the pistons 27 as is well known in this art.

An intake charge is delivered to the crankcase chambers 32 for compression therein by means of a charge forming and induction system, indicated generally by the reference numeral 36. The charge forming and induction system 36 includes an air inlet device 37 that is disposed within the protective cowling of the power head and which draws air therefrom. This air is admitted to the interior of the protective cowling by one or more air inlets formed primarily in the main cowling member 13.

A throttle valve 38 is positioned in the induction passage or intake manifold 39 that connects the air inlet device 37 to respective intake port 41 formed in the cylinder block 25 and/or crankcase member 33 and which communicate with the crankcase chambers 32 in a well known manner.

Reed type check valves 42 are provided in each of the intake ports 41 so as to permit a charge to flow into the crankcase chambers 32 when the pistons 27 are moving upwardly in the cylinder bores 26. On the other hand, when the pistons 27 move downwardly these valves 42 close and the charge is compressed in the crankcase chambers 32. The compressed charge is transferred to the combustion chambers through one or more scavenge passages 43.

Fuel is supplied to the air charge admitted as thus far described by a fuel supply system, indicated generally by the reference numeral 44. This fuel supply system 44 includes one or more fuel injectors 45 that spray into each of the intake passages 39. The fuel injectors 45 are of the electrically operated type having electrically actuated solenoid injector valves (not shown) that control the admission or spraying of fuel into the intake passages 39 upstream of the check valves 42.

Fuel is supplied to the fuel injectors from a fuel tank 46 positioned in the hull of the watercraft 10, as is well known in this art. The fuel is drawn through a supply conduit 50 having a priming pump 51 by a pumping system including an engine driven low pressure pump 47 and a filter 48.

The pumped fuel is passed from the filter 48 to a vapor separator 49 through a valve operated by a float. An electrically driven high pressure pump 52 increases the fuel pressure and discharges into a main fuel rail 53. The high pressure pump 52 may preferably be positioned in the vapor separator 49 but is shown externally for ease of illustration. The fuel rail 53 supplies fuel to each of the fuel injectors 45 in a known manner.

A pressure control valve 54 is provided in or adjacent the fuel rail 53 and controls the maximum pressure in the fuel rail 53 by dumping excess fuel back to the fuel tank 46 or some other place in the system upstream of the fuel rail 53 through a return conduit 55. The fuel that is mixed with the air in the induction and charge forming system 36 as thus far described will be mixed and delivered to the combustion chambers through the same path already described.

Spark plugs 56 are mounted in the cylinder head 34 and have their gaps extending into the respective combustion chambers. These spark plugs 56 are fired by ignition coils that are actuated by an ignition circuit that is controlled by a control means which includes an electronic control unit or ECU 57 which will be discussed in detail later.

When the spark plugs 56 fire, the charge in the combustion chambers 35 will ignite, bum and expand. This expanding charge drives the pistons 27 downwardly to drive the crankshaft 15 in a well known manner. The exhaust gases are then discharged through one or more exhaust ports 58 which open through the sides of the cylinder block bores 26. The exhaust ports 58 of each cylinder bank communicate with a respective exhaust manifold 59 shown in the lower left side view of FIG. 2.

Referring now primarily to the lower left hand side view of FIG. 2, each exhaust manifold 59 terminates in a downwardly facing exhaust discharge passage that is formed in an exhaust guide plate 60 upon which the engine 12 is mounted. This exhaust guide plate 60 delivers gases to a respective exhaust pipe 61 that depends into the drive shaft housing 16.

The drive shaft housing 16 defines an expansion chamber 62 in which the exhaust pipe 61 terminates. From the expansion chamber 62, the exhaust gases are discharged to the atmosphere in any suitable manner such as by means of a underwater exhaust gas discharge which discharges through the hub of the propeller 18 in a manner well known in this art. At lower speeds when the propeller 18 is more deeply submerged, the exhaust gases may exit through and above the water atmospheric exhaust gas discharge (not shown) as also is well known in this art.

In addition to controlling the timing of the firing of the spark plugs 56, the ECU 57 also controls the timing and duration of fuel injection of the fuel injector 45 and may control other engine functions. For this purpose, there are provided a number of engine and ambient condition sensors. In addition, there is provided a feedback control system through which the ECU 57 controls the fuel air ratio in response to the measurement of the actual fuel air ratio by a combustion condition sensor such as an oxygen ($O_2$) sensor 63 which is positioned to communicate with one of the cylinder bores 26 in a suitable manner.

In addition to the $O_2$ sensor 63, other sensors of engine and ambient conditions are provided. These include an in-cylinder pressure sensor 65 and knock sensor 66 that are mounted in the cylinder head 34 and cylinder block 25, respectively. The outputs from these sensors are transmitted to the ECU 57.

Air flow to the engine may be measured in any of a variety of fashions and this may be done by sensing the pressure in the crankcase chamber 32 by means of a pressure sensor 67. As is known, actual intake air flow can be accurately measured by the measuring the pressure in the crankcase chamber 32 at a specific crank angle. A crank angle position sensor 68 is, therefore, associated with the crankshaft 15 so as to output a signal to the ECU 57 that can be utilized to calculate intake air flow and, accordingly, the necessary fuel amount so as to maintain the desired fuel air ratio. The crank angle sensor 68 may be also used as a means for measuring engine speed, as is well known in this art.

Intake air temperature is measured by a temperature sensor 69 which is also positioned adjacent to or in the intake port 41.

Exhaust gas back pressure is measured by a back pressure sensor 71 that is mounted in a position to sense the pressure in one of the exhaust manifolds 59.

Engine temperature is sensed by an engine temperature sensor 72 that is mounted in the cylinder block 25 and which extends into its cooling jacket. In this regard, it should be noted that the engine 12 is, as is typical with outboard motor practice, cooled by drawing water from the body of the water in which the outboard motor 11 operates. This water is circulated through the engine 12 and specifically its cooling jackets and then is returned to the body of water in any suitable return fashion. The temperature of this water is measured by a sensor 70.

In addition other ambient conditions such as atmospheric air pressure are transmitted to the ECU 57 by an appropriate sensor represented by the box 73.

A trim angle sensor 74 is provided adjacent the trim pin 24 so as to provide a signal indicative of the trim angle.

The watercraft and specifically the mounting for the outboard motor 11 may also include an arrangement for adjusting its height and the height position is sensed by a sensor 75, also indicated by a block.

The condition of the transmission which drives the propeller 19 and specifically whether this transmission is in neutral or not is determined by a neutral detector switch 76. In addition to those conditions of the outboard motor 11 and its posture as well as the atmospheric conditions, certain watercraft conditions may also be sensed in the control system. These include a posture detector which determines the actual hull angle in the water and this sensor is indicated schematically by box 77. In addition, watercraft speed is measured by a sensor indicated by the box 78.

Finally, and most importantly to the invention, the position of the throttle valve 38 is sensed by a throttle position sensor, indicated by the reference numeral 79 and which is comprised of a potentiometer element 81 that is associated with the shaft of the throttle valve 38 and which provides an output signal in the form of a voltage that is representative of the angle of the throttle valve 38. This is an indication of operator demand and also of load on the engine.

The outboard motor 11 and particularly its engine 12 is also provided with a lubricating system. This lubricating system includes a lubricant storage tank 82 that is mounted in a convenient location either in the hull or in the protective cowling 13. An oil pump 83 which is controlled by the ECU 57 delivers the lubricant in metered quantities in response to engine running conditions for mixing with the fuel in the vapor separator 49. The lubricant oil level is sensed by a sensor 84 and this information is transmitted to the ECU 57.

Referring now specifically to the ECU 57, this includes an operational stage detection means, indicated schematically by the block 85 which processes the various signals from the engine and the watercraft condition sensors. Also included is an abnormality detection stage 86 which functions, in a manner which will be described by reference to FIGS. 3 and 4 so as to provide an indication when the output of the potentiometer 81 may be unreliable. Also included is a memory, indicated by the reference numeral 87.

This memory 87 contains a plurality of maps that are based upon certain data to provide engine control. This includes data such as the timing of beginning of fuel injection by the injectors 45, the duration of injection, and the timing of the firing of the spark plugs 56. This memory data also provides information for control at times when feedback control from the output of the oxygen sensor 63 is not feasible or desirable.

The basic control strategy for control of the engine 12 and its various systems may be of any type.

In order to control idle speed, the engine is provided with an idle bypass control valve 88 which is controlled by the ECU 57 so as to maintain the desired idle speed, again in accordance with any known control strategy.

As has been noted, the system is configured so as to provide automatic control based upon running conditions or map conditions when the output of the oxygen sensor 63 is not the appropriate mode of control. Regardless of which system is employed, it is necessary that the output from the throttle position sensor 79 and specifically its potentiometer 81 is accurate. This system includes a fail-safe control, indicated by the reference numeral 89 and warning display 91 which respectively monitors the condition of the sensor 79 and provide fail-safe control if this output is not reliable and also give the operator an indication of an abnormal condition so that corrections can be made as soon as possible.

Basically, the system operates so as to determine when the engine speed is within a certain range wherein it is unlikely that the throttle position will be changed. This is particularly convenient in connection with watercraft because they are frequently set at a cruising speed and this speed is not changed for time periods.

As an example, the cruising speed may be set at a speed when the engine is operating in a speed range between about 3,000 and 4,500 rpm. The system operates then to determine if there is a variation in the output of the throttle position sensor at a time when it is not expected that the throttle position will be changed and then the warning mode and warning display is initiated.

Figure 3:
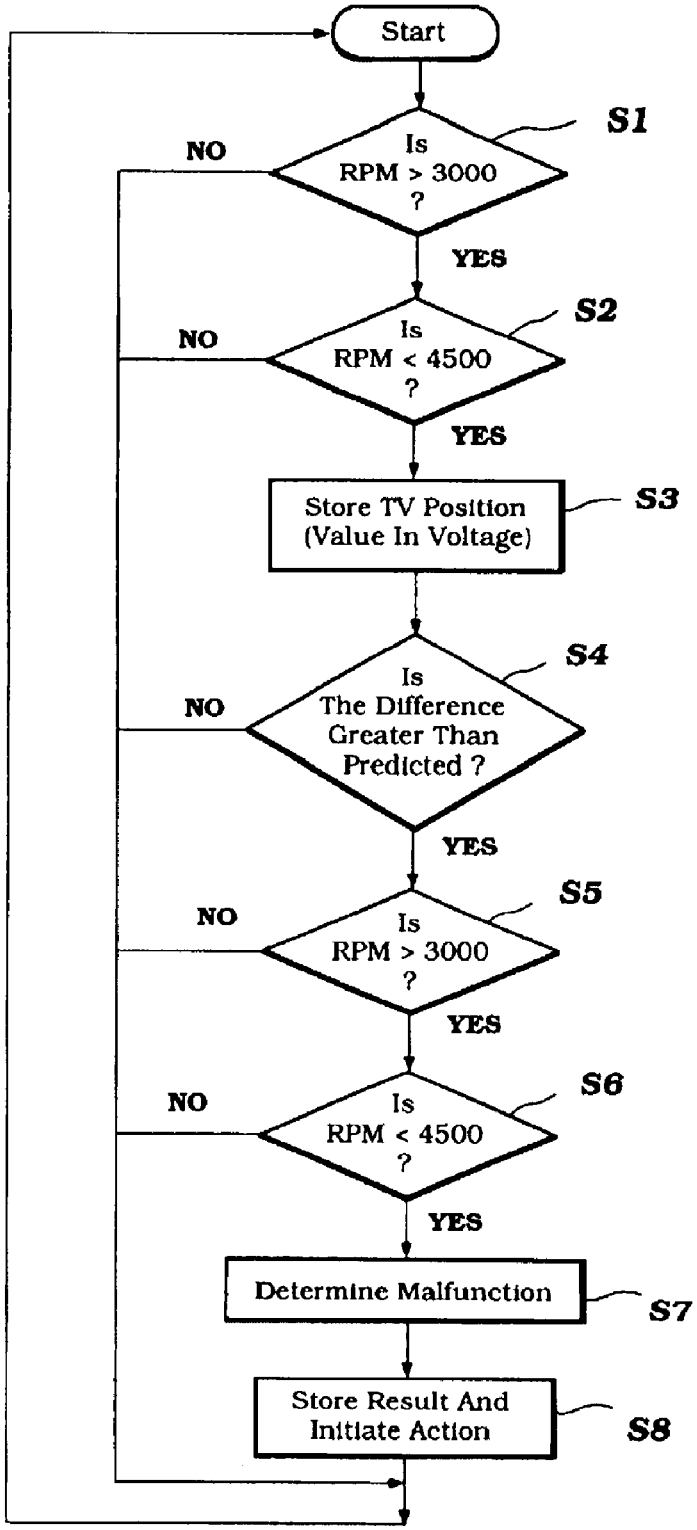
FIG. 3 is a block diagram of a first control routine for practicing the invention.

FIG. 3 shows a first embodiment of a control routine for practicing the invention. This control routine starts and first at the step S1 determines if the engine speed is below 3,000 rpm. If the engine speed is not below 3,000 rpm, the program moves ahead and repeats.

If, however, at the step S1 it is determined that the engine speed is greater than 3,000 rpm then the program moves to the step S2 to determine if the rpm is less than 4,500 rpm and thus is operating in the normally stable range of throttle position. If at the step S2 the engine speed is not less than 4,500 rpm, the program moves ahead and repeats.

If, however, at the step S2 it is determined that the engine speed is below 4,500 and hence is in the range of 3,000 to 4,500 rpm, the program moves ahead to read the throttle valve position and to store this value in a memory.

As noted, in the illustrated embodiment, the potentiometer output signal is a voltage and hence the voltage value is stored. The program then moves to the step S4 to determine if the variation in reading of the throttle valve position is greater than a predetermined amount from the previously-measured value. This may be if the voltage variance is more than say for example 2 volts. If the difference is not greater than the predetermined value, the program moves ahead and repeats.

If, however, the difference is greater than a predetermined value, then the program moves through a routine to see if the engine is still operating in the normal range where variations are not expected, i.e., 3,000 to 4,500 rpm. Thus, the program moves to the step S5 to check if the engine speed is greater than 3,000 rpm. If it is not, the program moves ahead and repeats.

If, however, the speed is above 3,000 rpm, then the program moves to the step S6 to confirm that it is within the range and less than 4,500 rpm. If not, the program repeats.

If, however, it is determined that the step S6 if the engine speed is less than 4,500 rpm and hence is in the 3,000 to 4,500 rpm phase, the program moves ahead to determine the existence of a malfunction at the step S7 and then to the step S8 so as to store the results of these determinations and to initiate protective action by initiating a control that does not require throttle position for its variable and by giving a warning.

Figure 4:
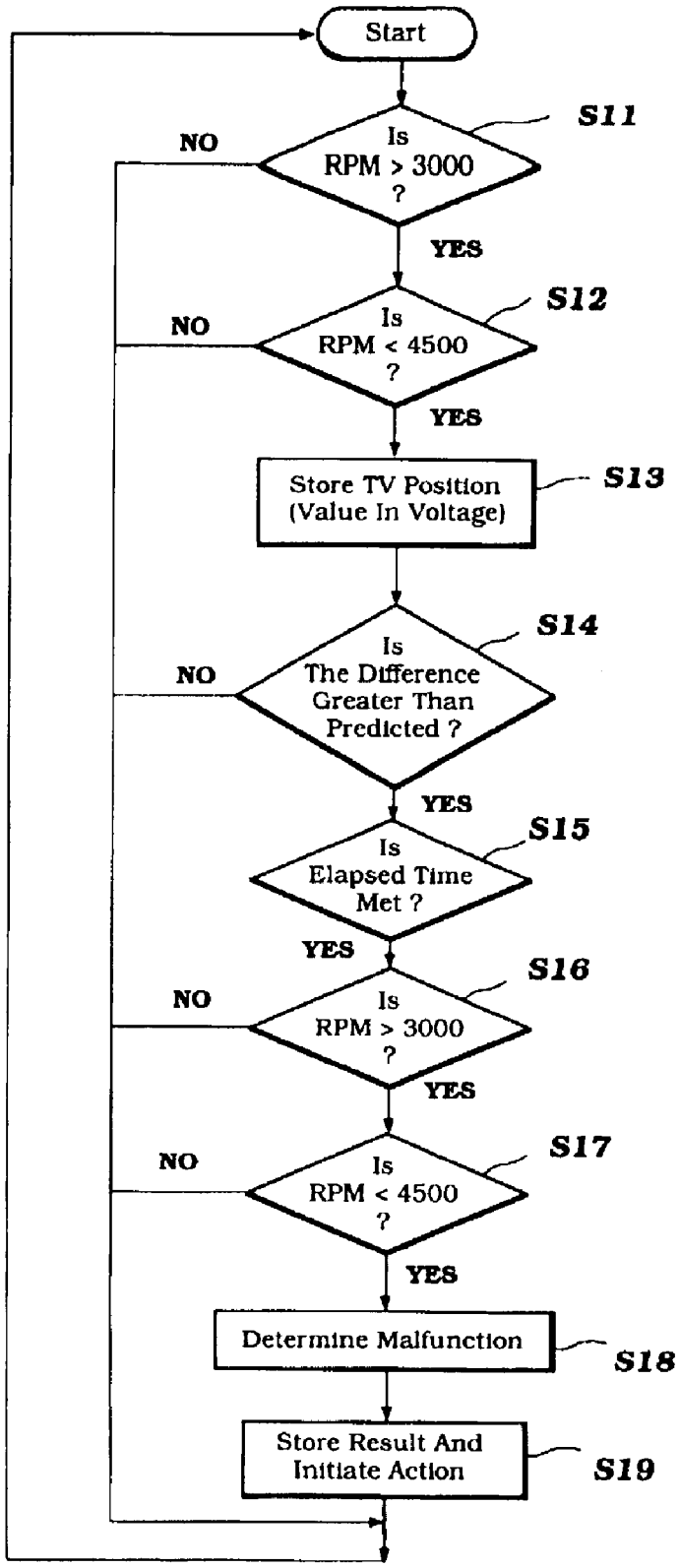
FIG. 4 is a block diagram, in part similar to FIG. 3, and shows another control routine for practicing the invention.

The methodology described in FIG. 3 is one that merely makes comparisons between throttle position on a repeated basis and at preset times. FIG. 4 shows another form of control routine that can be utilized in conjunction with the invention.

Basically, this program operates so as to perform a similar set of steps to the program in S13 but the program waits a predetermined time period before the comparison is made. Thus, the program starts and again moves through the step S11, S12, S13 and S14 which are the same as the steps S1, S2, S3 and S4. That is, it is first determined whether the speed is greater than 3,000 rpm and if it is then it is determined that the speed is less than 4,500 rpm to determine that it is within the normally stable throttle position range. The program then stores the throttle valve position if it is within this range at the step S13 and makes the comparison at the step S14 to see if the difference is greater than the predetermined difference. In the case of voltage signals, this may be an indication that the voltage varies by more than two volts.

However, the program then waits a predetermined time period at the step S15 and this predetermined time period may be something in the order of one or two seconds. The reason for making this delay is that if the operator has called for a change in engine speed it is desirable to give the system a chance to respond and determine if the operator has intentionally called for a change in engine speed.

Thus, after the time set at the step S15 is run, the program moves to the step S16 to determine if the engine speed is still greater than 3,000 rpm. If not, it repeats.

If, however, the speed is greater than 3,000 rpm then at the step S17 it is determined if the speed is still less than 4,500 rpm. If not, the program repeats.

If, however, at the step S16 and S17 it is determined that the engine is still operating in this range, then the program moves to the step S18 to determine that a malfunction has occurred and to the step S19 to store the results of the malfunction and to initiate protective action and to display a warning.

Thus, from the foregoing description it should be readily apparent that the described system is quite effective in providing good engine control and verification that the important throttle position sensor is outputting a signal truly indicative of the throttle position. If it is not, then another form of control routine is employed.

Of course, the various embodiments shown are those preferred forms which the invention can take, but various changes and modifications may be made without departing from the spirit and scope of the invention as defined by the appended claims.

I claim:

1. An engine control system for an internal combustion engine having a combustion chamber, an air fuel induction system for delivering an air fuel charge to said combustion chamber, an ignition system for igniting the charge in said combustion chamber, an operator demand throttle control for controlling the engine output in response to operator demand, a throttle position sensor for sensing the position of said throttle control, control means for controlling said air fuel charging system and said ignition system in response to sensed engine condition including the condition of said throttle position sensor for controlling engine operation, means for detecting whether the output of said throttle position sensor is accurate by checking to determine if there are changes in its output signal when the engine is judged to be operating in a speed range where throttle position changes are not normally encountered, and providing an indication of abnormality of the throttle position sensor output if the output varies within that speed range.

2. An engine control system for an internal combustion engine as set forth in claim 1, wherein the predetermined speed range is a speed range wherein the throttle position is not normally changed.

3. An engine control system for an internal combustion engine as set forth in claim 1, further including a memory for storing the indication of abnormal conditions.

4. An engine control system for an internal combustion engine as set forth in claim 1, further including means for displaying the abnormal condition to the operator.

5. An engine control system for an internal combustion engine as set forth in claim 1, wherein the engine speed is again checked after the comparison is made before an indication of abnormality is noted so as to ensure that the engine is still operating within the predetermined speed range.

6. An engine control system for an internal combustion engine as set forth in claim 5, wherein a time delay is initiated before the speed is again checked to determine if it is within the predetermined range.

7. An engine control system for an internal combustion engine as set forth in claim 1, wherein the engine powers a watercraft and the predetermined speed is the speed when the watercraft is cruising.

8. An engine control method for an internal combustion engine having a combustion chamber, an air fuel induction system for delivering an air fuel charge to said combustion chamber, an ignition system for igniting the charge in said combustion chamber, an operator demand throttle control for controlling the engine output in response to operator demand, a throttle position sensor for sensing the position of said throttle control, said method comprising the steps of controlling said air fuel charging system and said ignition system in response to sensed engine condition including the condition of said throttle position sensor, detecting whether the output of said throttle position sensor is accurate by checking to determine if there are changes in its output signal when the engine is judged to be operating in a speed range where throttle position changes are not normally encountered, and providing an indication of abnormality of the throttle position sensor output if the output varies within that speed range.

9. An engine control method for an internal combustion engine as set forth in claim 8, wherein the predetermined speed range is a speed range wherein the throttle position is not normally changed.

10. An engine control method for an internal combustion engine as set forth in claim 8, further including a memory for storing the indication of abnormal conditions.

11. An engine control method for an internal combustion engine as set forth in claim 8, further including the step of displaying the abnormal condition to the operator.

12. An engine control method for an internal combustion engine as set forth in claim 8, wherein the engine speed is again checked after the comparison is made before an indication of abnormality is noted so as to ensure that the engine is still operating within the predetermined speed range.

13. An engine control method for an internal combustion engine as set forth in claim 12, wherein a time delay is initiated before the speed is again checked to determine if it is within the predetermined range.

14. An engine control method for an internal combustion engine as set forth in claim 8, wherein the engine powers a watercraft and the predetermined speed is the speed when the watercraft is cruising.

*15. An engine control system for an internal combustion engine as set forth in claim 1, wherein the control means is configured to provide fail safe control when the output of the throttle position sensor is not reliable.*

*16. An engine control system for an internal combustion engine as set forth in claim 1, wherein the control means is configured to control said air fuel charging system in a second mode that does not require throttle position data when the output of the throttle position sensor is not accurate.*

*17. An engine control system for an internal combustion engine as set forth in claim 8, additionally comprising fail safe control of the air fuel charging system when the throttle position sensor is not accurate.*

*18. An engine control system for an internal combustion engine as set forth in claim 8, additionally comprising controlling said air fuel charging system without using throttle position data as a variable when the output of the throttle position sensor is not accurate.*

* * * * *